Aug. 30, 1938.  J. E. MYER ET AL  2,128,844
SEATING TOOL FOR TIMBER CONNECTER
Filed Oct. 12, 1936  2 Sheets-Sheet 1

Inventors
James E. Myer,
Arthur C. Horner and
Paul E. Magerstadt
By Browne & Phelps
Attorneys

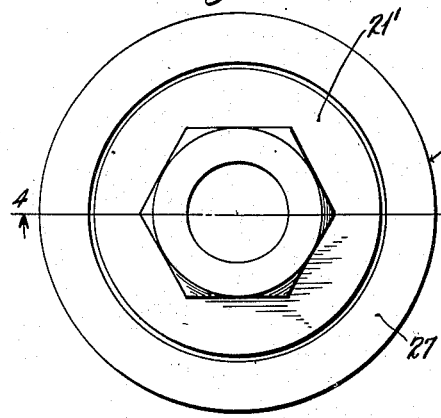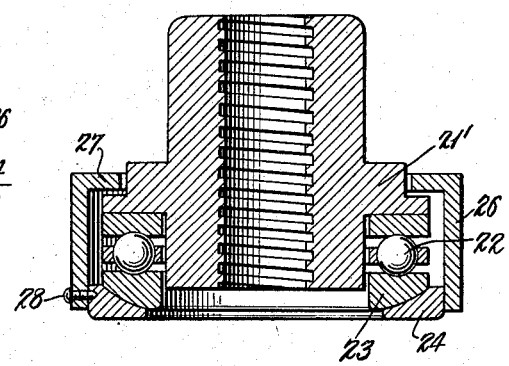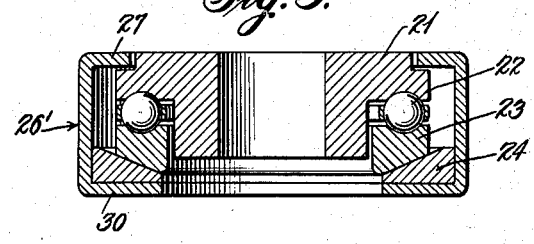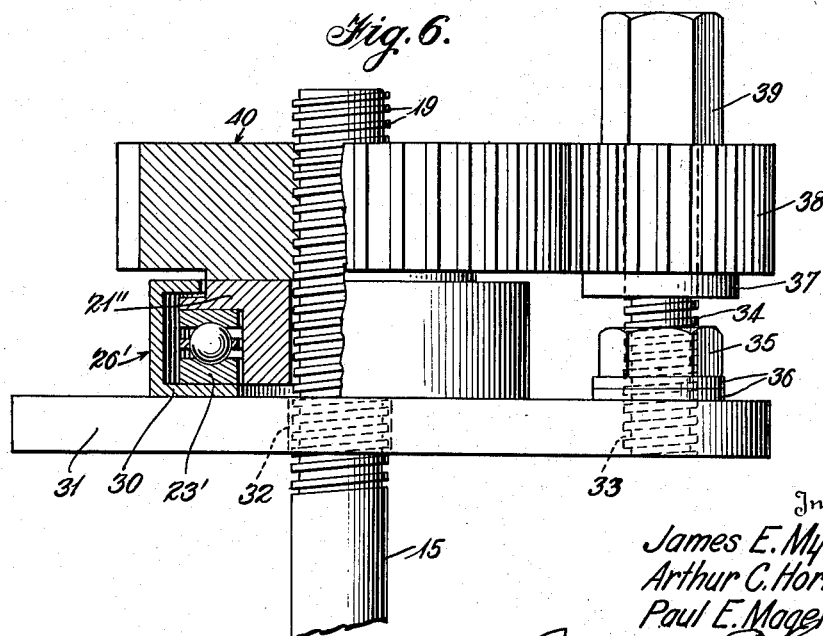

Patented Aug. 30, 1938

2,128,844

UNITED STATES PATENT OFFICE 2,128,844

SEATING TOOL FOR TIMBER CONNECTERS

James E. Myer, Washington, D. C., and Arthur C. Horner and Paul E. Magerstadt, San Francisco, Calif., assignors to Timber Engineering Company, Washington, D. C., a corporation of Delaware Application October 12, 1936, Serial No. 105,344

1 Claim. (Cl. 1—50)

The invention relates to seating tools and has as an object the provision of a tool in the nature of a press for use in seating timber connecters.

It is a further object of the invention to provide a tool of this class having means to adjust itself to bolt holes out of perpendicular.

It is a further object to lessen friction.

It is a still further object to provide increase of torque over that applied to a wrench applied to the tool.

Further objects will appear from the following description when read in connection with the accompanying drawings showing illustrative embodiments of the invention wherein:

Fig. 3 is a plan view of another form of the invention;

Fig. 4 is a vertical section on line 4—4 of Fig. 3;

Fig. 5 is a central vertical section of a still further form of the invention; and Fig. 6 is a view partly in side elevation and partly in vertical section of a still further form of the invention.

Figure 1:
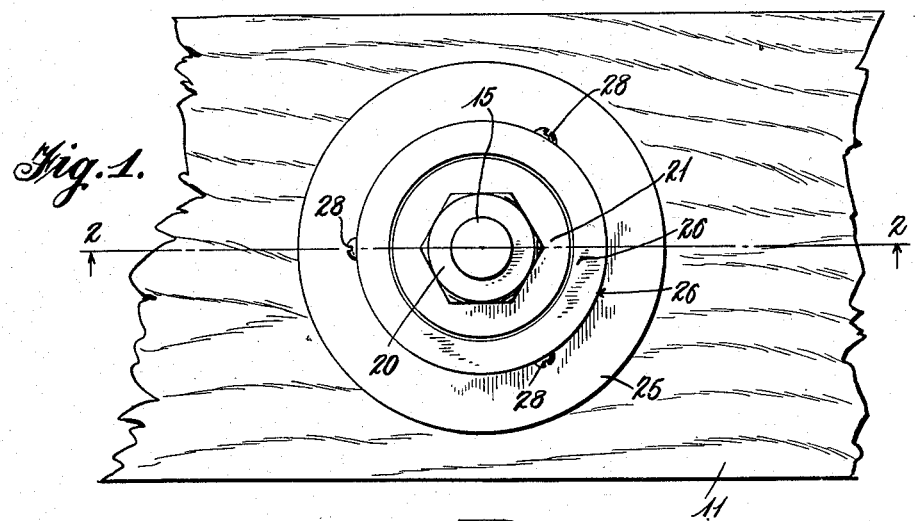
Fig. 1 is a plan view of one form of the invention in use.
Figure 2:
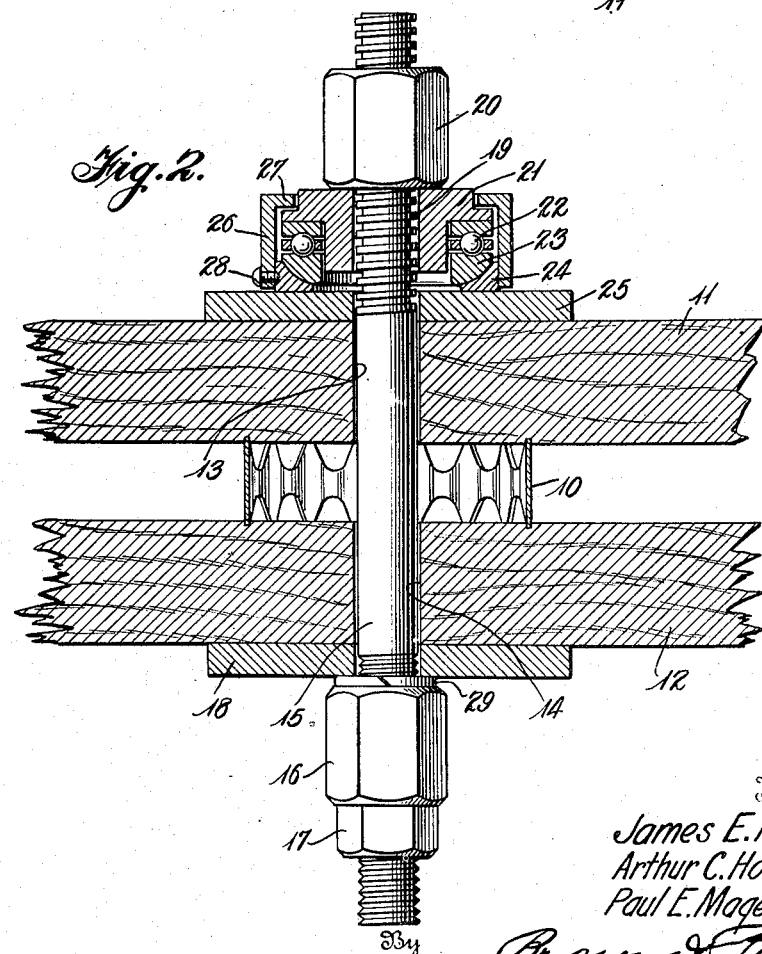
Fig. 2 is a vertical section partly in elevation of the structure of Fig. 1 on line 2—2 thereof.

As shown in Figs. 1 and 2 the device is shown in use to seat a connecter ring 10 into two timbers 11 and 12 which have been initially provided with bolt holes 13, 14 through which a bolt is to be passed after the connecter has been seated.

As shown in these figures the device comprises a bolt 15 provided with a nut 16 and lock nut 17 bearing upon a washer 18. The remaining end of the bolt is shown as threaded at 19 to coact with a nut 20 to apply the seating force. The threads 19 are preferably square threads as such threads apply pressure with a minimum of friction.

To reduce friction the nut 20 is shown bearing upon a rotatable member 21 which transmits pressure through anti-friction bearings 22 to member 23 which in turn bears upon ring 24 bearing on washer 25, which seats on timber 11. To hold the parts 21 to 24 inclusive in assembly sleeve 26 is shown formed with an annular flange 27 overlying a portion of member 21 and secured by screws 28 to ring 24.

To allow the rings 23 and 24 to adjust the device to holes 13, 14 which may be slightly out of perpendicular, the meeting surfaces of these rings are shown convex and concave respectively. To prevent revolution of the bolt 15, which would defeat operation of the device, a lock washer is provided at 29.

The form shown in Figs. 3 and 4 differs from that already described only in that the member 21' is made integral with the nut.

The form of Fig. 5 has the revoluble member 21 similar to the form of Figs. 1 and 2. In this form the anti-friction bearing is shown simplified, and the sleeve 26' is shown as turned into an annular flange to hold the parts in assembly in conjunction with flange 27. In effect this form makes integral sleeve 26 and ring 24 of the other form.

Fig. 6 shows a device embodying means to provide an increase of torque.

A plate 31 replaces the washer 25 of the other forms which plate is perforated at 32, for passage of the bolt 15, and also at 33 which latter perforation is screw-threaded. A stud shaft 34 is shown screw-threaded at its lower end and secured in the perforation 33 by nut 35 and lock washers 36.

A collar 37 is provided preferably rigidly secured upon shaft 37. A gear 38 integral with the nut 39 is freely revoluble on the shaft 34.

In mesh with gear 38 are the teeth of gear 40 which gear is internally threaded to coact with square threads 19 on bolt 15. The member 21" is shown as internally smooth and in such case may be rigidly secured to or integral with gear 40 or simply in contact therewith. In either case the part 21" is designed to revolve with the gear 40. In this form of the invention the coacting surfaces of ring 23' and flange 30 of sleeve 26' are shown as plane surfaces as the axes of shaft 34 and bolt 15 should remain parallel.

The device may be used to seat any form of timber connecter which requires to be embedded into the faces of the work by pressure. The lower threads for nuts 16, 17 should be long enough to enable adjustment for all sizes of timbers upon which it is desired to use the device. The length of threads 19 need be only a little more than the over all axial dimension of the connecters, but excess thread at 19 will in many cases make adjustment of nuts 16, 17 unnecessary.

It is obvious that an integral head may be provided on the bolt to replace the nuts 16, 17 in which case the thread 19 should be long enough to accommodate all desired sizes of timbers and connecters.

Minor changes may be made in the physical embodiment of the invention, within the scope of the appended claim, without departing from the spirit thereof.

We claim:

A timber-connecter seating tool comprising, in combination: a bolt member to be passed through holes formed in timbers to be connected and through a connecter in place to be seated; said member having V screw threads at one extremity and square screw threads at its remaining extremity; a pair of lock nuts on said V threads and a lock washer to lie between one of said nuts and the adjacent timber; an internally screw threaded member outwardly constructed for application of torque and coacting with said square threads; a pair of rings formed with coacting universal movement surfaces, one thereof to transmit pressure to the remaining timber; a member revoluble with said internally screw threaded member; antifriction bearing means between said revoluble member and said pair of rings; and means to hold said rings, bearing means and revoluble member in assembly.

JAMES E. MYER.
ARTHUR C. HORNER.
PAUL E. MAGERSTADT.